US009094701B2

(12) United States Patent
Mildner et al.

(10) Patent No.: US 9,094,701 B2
(45) Date of Patent: Jul. 28, 2015

(54) METHOD AND TELECOMMUNICATIONS SYSTEM FOR REGISTERING A USER WITH AN IPTV SERVICE

(71) Applicant: DEUTSCHE TELEKOM AG, Bonn (DE)

(72) Inventors: Frank Mildner, Weiterstadt (DE); Martin Messmer, Berlin (DE); Ingo Friese, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/379,318

(22) PCT Filed: Feb. 20, 2013

(86) PCT No.: PCT/EP2013/053395
§ 371 (c)(1),
(2) Date: Aug. 18, 2014

(87) PCT Pub. No.: WO2013/124331
PCT Pub. Date: Aug. 29, 2013

(65) Prior Publication Data
US 2015/0040154 A1    Feb. 5, 2015

(30) Foreign Application Priority Data
Feb. 22, 2012   (EP) .................................... 12001169

(51) Int. Cl.
*H04N 7/16* (2011.01)
*H04N 21/258* (2011.01)
(Continued)

(52) U.S. Cl.
CPC ........ *H04N 21/25875* (2013.01); *H04L 63/083* (2013.01); *H04L 65/1073* (2013.01);
(Continued)

(58) Field of Classification Search
CPC .............. H04N 7/163; H04N 21/4632; H04N 21/4751; H04N 21/4532; H04N 21/47202
USPC ................... 725/30, 46, 62, 87; 709/217–232
See application file for complete search history.

(56) References Cited

U.S. PATENT DOCUMENTS 7,991,385 B1 *   8/2011   Rosenberg et al. ........... 455/406
8,693,398 B1 *   4/2014   Chaganti et al. .............. 370/328
(Continued)

FOREIGN PATENT DOCUMENTS

WO   WO 2009071132 A1   6/2009
WO   WO 2010086764 A2   8/2010

OTHER PUBLICATIONS

Youn-Kyoung Park, et al., "User Authentication Mechanism using Java Card for Personalized IPTV Services", International Conference on Convergence and Hybrid Information Technology 2008, IEEE Computer Society, Aug. 28, 2008, pp. 618-626.

*Primary Examiner* — Annan Shang
(74) *Attorney, Agent, or Firm* — Leydig, Voit & Mayer, Ltd.

(57) ABSTRACT

A method for protecting privacy when a user logs into a secured personalized IPTV service includes: requesting a secured personalized IPTV service at an IPTV terminal; transmitting an address of the authentication service and a session identifier of the secured personalized IPTV service from the authentication service to the IPTV terminal; transferring the address of the authentication service and the session identifier of the secured personalized IPTV service to the mobile communications device; transmitting an authentication message that includes an authentication request and an identification number of the mobile communications device, from the authentication application of the mobile communications device to the authentication service; performing secure authentication between the authentication service and the mobile communications device; and logging the user into the secured personalized IPTV service.

14 Claims, 2 Drawing Sheets

(51) Int. Cl.
   *H04N 21/254* (2011.01)
   *H04N 21/61* (2011.01)
   *H04N 21/643* (2011.01)
   *H04W 12/06* (2009.01)
   *H04N 21/414* (2011.01)
   *H04N 21/441* (2011.01)
   *H04L 29/06* (2006.01)

(52) U.S. Cl.
   CPC .......... *H04L65/4084* (2013.01); *H04N 21/254* (2013.01); *H04N 21/41407* (2013.01); *H04N 21/441* (2013.01); *H04N 21/6125* (2013.01); *H04N 21/64322* (2013.01); *H04W 12/06* (2013.01); *H04L 63/0421* (2013.01); *H04L 63/0838* (2013.01)

(56) References Cited

U.S. PATENT DOCUMENTS

| | | | |
|---|---|---|---|
| 2006/0274766 A1* | 12/2006 | Kwon | 370/401 |
| 2008/0026740 A1* | 1/2008 | Netanel | 455/419 |
| 2009/0180614 A1* | 7/2009 | Rajagopal et al. | 380/228 |
| 2011/0032814 A1* | 2/2011 | Wen et al. | 370/217 |
| 2011/0202970 A1* | 8/2011 | Kato et al. | 726/1 |
| 2011/0209188 A1* | 8/2011 | Petersson et al. | 725/110 |

* cited by examiner

METHOD AND TELECOMMUNICATIONS SYSTEM FOR REGISTERING A USER WITH AN IPTV SERVICE

CROSS-REFERENCE TO RELATED APPLICATIONS

This application is a U.S. National Phase application under 35 U.S.C. §371 of International Application No. PCT/EP2013/053395, filed on Feb. 20, 2013, and claims benefit to European Patent Application No. EP 12001169.7, filed on Feb. 22, 2012. The International Application was published in German on Aug. 29, 2013 as WO 2013/124331 under PCT Article 21(2).

FIELD

The invention relates to a method for protecting privacy when a mobile communications network subscriber logs into IPTV services, and to a telecommunications system for performing such a method.

BACKGROUND

IPTV (Internet Protocol Television) refers to the use of an IP-based network for transferring television, possibly supplemented by additional multimedia services such as video, audio, text, images, or data. IPTV services are provided by a telecommunications provider via its own broadband network to a limited group of users. This is the difference between IPTV and so-called Internet television ("TV over Internet") in which any program or content available on the internet can be downloaded anytime and anywhere by any internet user. Accordingly, the IP-based network which is used in IPTV instead of conventional transmission ways such as broadcast, cable, or satellite, is the broadband network of a telecommunications provider, for example.

A personalized IPTV product refers to an individually tailored configuration of IPTV contents, rates, and/or other options customized for a user. The purpose of personalization may be child protection, for example, or the provision of individual program packages for multi-person connections.

Current methods for identification, authentication and authorization of a user of a personalized IPTV product are based on a procedure in which the user discloses his or her identity, for example by entering an appropriate identifier at the relevant IPTV terminal using a menu provided by the IPTV service, and in a second step the user enters a password at the IPTV terminal. Alternatively, appropriate data such as user name and password may be stored in the IPTV terminal.

Thus, either the user must identify directly to the IPTV service, or the user's IPTV terminal identifies itself by means of user data it has stored. With a foreign IPTV terminal which does not have user data stored, the only alternative for the user is to enter his data, so that privacy protection is not guaranteed for the user. Moreover, errors may occur upon data entry, since the user has to enter user-specific data at the IPTV terminal to accomplish authentication.

Also, hardware-based procedures are known, which use Common Interface (CI) cards, or CI modules, as well as derivative CI+ thereof. However, these are not suitable for mobile use, since receivers and TV sets might apply different or no CI modules at all, and moreover software updates might be necessary which in case of mobile use, for example on IPTV terminals that do not belong to the user, such as in hotels, are not feasible.

SUMMARY

In an embodiment, the invention provides a method for protecting privacy when a user logs into a secured personalized IPTV service using a mobile communications device that is subscribed to a mobile network operator and in which an authentication application is installed. The method includes requesting a secured personalized IPTV service at an IPTV terminal; establishing a communication connection between the IPTV terminal and an authentication service; transmitting an address of the authentication service and a session identifier of the secured personalized IPTV service from the authentication service to the IPTV terminal; transferring the address of the authentication service and the session identifier of the secured personalized IPTV service to the mobile communications device; in response to the address of the authentication service, transmitting an authentication message that includes an authentication request and an identification number of the mobile communications device, from the authentication application of the mobile communications device to the authentication service; performing secure authentication between the authentication service and the mobile communications device; in response to successful authentication, generating a password, and determining an IPTV user identifier associated with the identification number of the mobile communications device, by the authentication service; transmitting the password to the IPTV terminal; transmitting the IPTV user identifier to the secured personalized IPTV service; and logging the user into the secured personalized IPTV service by transmitting the password from the IPTV terminal to the secured personalized IPTV service.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
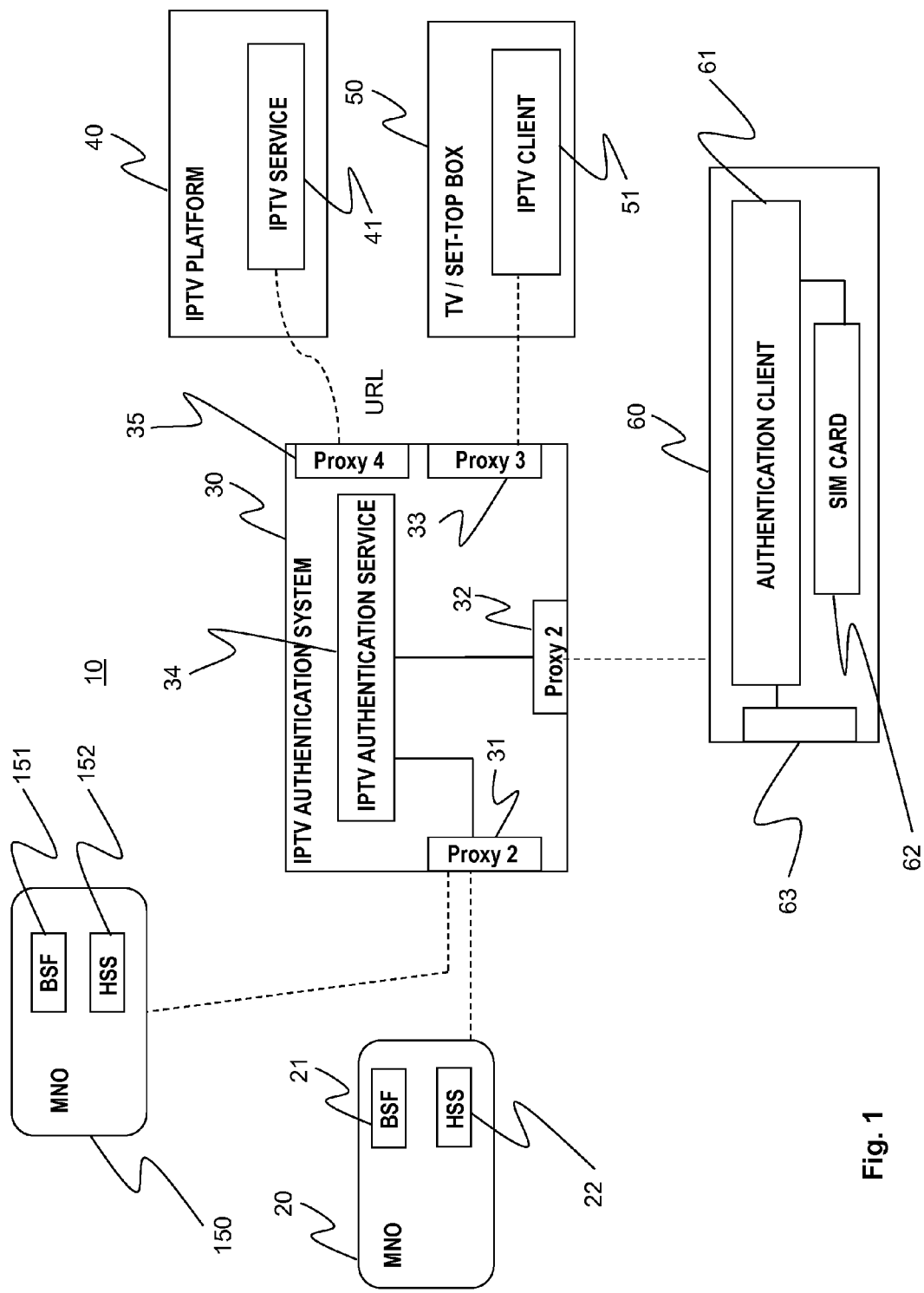
FIG. 1 shows a basic configuration of a telecommunications system in which the invention is implemented.

The invention provides a method and a telecommunications system for privacy protection when a user logs into a secured personalized IPTV service, which protects the privacy of the user, largely prevents operating errors, and is easy to handle.

In an embodiment, it is not the user who has to identify himself or herself to a desired IPTV service, rather the desired IPTV service and the authentication service involved in the authentication procedure must identify themselves to the user. Further, the user does not have to enter user-based data at an IPTV terminal or mobile communications device for the purpose of authentication. In this manner, operating errors can be prevented. All this is achieved by accomplishing the authentication required for the user to log into the secured personalized IPTV service between the user's mobile communications device and an authentication service. For this purpose, the authentication process only has to be initialized by the user through an appropriate start command once the IPTV service has identified itself to the user.

Technical specifications 3GPP TS 24.109, 3GPP TS 29.109, and GPP TS 33.223 are considered for carrying out the authentication process.

In an embodiment, a method is provided for protecting privacy when a user logs into a secured personalized IPTV service using a mobile communications device that is subscribed to a mobile network operator and in which an authentication application is installed.

First, a user requests a secured personalized IPTV service via an IPTV terminal, preferably using an IPTV application installed in the IPTV terminal. Since the IPTV application is preferably configured as a client application, it will in short be referred to as an IPTV client below. The IPTV terminal may be a set-top box which is typically provided by the IPTV provider and which comprises a first interface for connection to a broadband network and a second interface for connecting a television set. Alternatively, the IPTV terminal may be configured as a TV set which has the functionality of the set-top box, in particular that of the IPTV client, integrated therein. It is also conceivable to use, as an IPTV terminal, an ordinary personal computer that has a specific software application installed which is supported by the IPTV service. It should be noted here that a secured IPTV service refers to an IPTV service that requires registration or authentication, and that a personalized IPTV service refers to an IPTV service individually tailored to a user, for example in terms of IPTV contents, rates, and/or other options.

A secure IPTV service may be requested by a user in conventional manner, for example by selecting the desired IPTV service in a menu of an IPTV terminal. Thereby, a communication connection is established between the IPTV terminal and an authentication service.

Such a communication connection may be established automatically. However, it is also conceivable that, for example, a menu item "User Login" is provided for the requested IPTV service in an operating menu provided by the IPTV terminal, which offers the option "Personalized IPTV". If the user selects this option, a corresponding authentication request or a corresponding log-in request is directed to the authentication service.

The authentication service may be installed in an authentication system or authentication computer of the mobile network operator to which the mobile communications device is subscribed, or of another mobile network operator. Then, the address of the authentication service and a session identifier, also referred to as a session ID, which unambiguously identifies the communication connection of the user to the secured personalized IPTV service, are transmitted from the authentication service to the IPTV terminal. In this way, the authentication service and the requested IPTV service identify themselves to the user, and not vice versa.

It should be noted at this point that there are many ways to notify the authentication service about the session ID of the requested IPTV service.

Advantageously, the address of the authentication service and the session ID of the secured personalized IPTV service may be transmitted to the IPTV terminal in form of encoded information, in particular as a barcode.

The address of the authentication service and the session ID of the secured personalized IPTV service received in the IPTV terminal are then transferred to the mobile communications device.

In case a barcode is transmitted, the barcode may be transferred from the TV set to the mobile communications device using a code reader or a camera of the mobile communications device. However, it is also conceivable, for example, that the encoded information is transferred from the IPTV terminal to the mobile communications device via a Bluetooth interface, for example, automatically after receipt, or as controlled by the user.

The authentication application of the mobile communications device evaluates the address of the authentication service and transmits an authentication message which includes at least an authentication request and an identification number of the user registered through the mobile communications device, to the authentication service.

Preferably, the session ID of the requested IPTV service may also be evaluated. The authentication message may be transmitted after having been authorized by the user, for example by simple acknowledgment, or by entering a PIN at the mobile communications device. The authentication request requests the authentication service to start the authentication procedure. The authentication message is transmitted via the mobile communications network of the mobile network operator to which the mobile communications device is subscribed.

In response to the authentication request, the authentication service initiates a secure authentication procedure between the mobile communications device and the authentication service. Once authentication is successfully completed, the authentication service generates a password and transmits this password to the IPTV terminal. It is important to note that the password does not contain any user-specific data. The password may be a single-use password, also referred to as a one-time token.

In order to be able to provide the personalized IPTV, the authentication service determines an IPTV user identifier based on the identification number of the user registered through the mobile communications device, for example using a mapping table it has stored, and transmits it to the IPTV service which is able to provide personalized IPTV based on the IPTV user identifier. Other user parameters or user attributes associated with the IPTV user identifier, such as the age of the user, or IPTV products ordered by the user, may be stored in the authentication service and may also be transmitted to the IPTV service.

For log-in to the secured personalized IPTV service, the password is then transmitted from the IPTV terminal to the secured personalized IPTV service.

Based on a trusted relationship between the IPTV service and the authentication service, the IPTV service may now validate the password with the authentication service.

Alternatively, the authentication service may transmit the password to the secure IPTV service, too, and the IPTV service will then check if the passwords received from the authentication service and from the IPTV terminal match.

The secure authentication of the mobile communications device with the authentication service may suitably be a challenge-response procedure.

Advantageously, the authentication service requests the authentication information required for performing the challenge-response procedure from the mobile network operator to which the mobile communications device is subscribed.

According to an exemplary embodiment, the authentication between the authentication service, the mobile network operator, and the mobile communications device is performed according to 3GPP TS 33.223 specification.

According to an advantageous modification, the authentication message generated by the authentication application of the mobile communications device further includes the address of the authentication service and the session ID of the selected IPTV service.

In an embodiment, a telecommunications system is provided for the protection of privacy when a user logs into a secured personalized IPTV service using a mobile communications device.

The telecommunications system comprises a platform which provides at least one secure personalized IPTV service. Furthermore, an IPTV terminal is provided. Using the IPTV terminal, the user may request a secured personalized IPTV service. The telecommunications system further comprises at least one mobile communications device subscribed to a mobile network operator, on which an authentication application is installed. Furthermore, an authentication service is provided which communicates with the IPTV terminal via a first communication interface and with the authentication application of the mobile communications device via a second communication interface. Conveniently, the authentication service is installed in a separate authentication system of the mobile network operator to which the mobile communications device is subscribed, or of another mobile network operator. The authentication service is adapted to transmit the address of the authentication service and the session ID of a secure personalized IPTV service selected at the IPTV terminal to the IPTV terminal. The telecommunications system further comprises means for transferring the address of the authentication service and the session ID of the requested IPTV service to the authentication application of the mobile communications device. In response to the address of the authentication service received, the authentication application of the mobile communications device generates an authentication message which includes an authentication request and an identification number of the mobile communications device, and transmits this authentication message to the authentication service, via a mobile communications network. To ensure the protection of privacy when the user logs into the secured IPTV service, the authentication service and the authentication application of the mobile communications device are adapted to perform a secure authentication procedure. Once authentication was successful, the authentication service generates a password and transmits this password to the IPTV terminal, via the first communication interface. Further, the authentication service determines an IPTV user identifier associated with the identification number of the mobile communications device and transmits this IPTV user identifier to the IPTV service, for customizing purposes. The IPTV terminal is adapted to transmit the password to the IPTV service, automatically or with acknowledgment of the user. In response to the password received, the IPTV service grants access for the user. In this way, the user may log into the secured personalized IPTV service anonymously, for example.

Advantageously, the authentication service and the authentication application of the mobile communications device are adapted to perform a challenge-response procedure.

According to an advantageous modification, the authentication service communicates with an authentication means of the mobile network operator to which the mobile communications device is subscribed, via a third communication interface, in order to obtain the information required for the challenge-response procedure.

According to an advantageous embodiment, the authentication service, the authentication application of the mobile communications device, and the authentication means of the mobile network operator are adapted to perform the authentication procedure according to the 3GPP TS 33.223 specification. In this case, a Bootstrapping Server Function (BSF) is installed in the authentication means.

Advantageously, the password received by the IPTV service from the IPTV terminal is validated by the IPTV service via a trusted communication interface of the authentication service.

The password may be a so-called one-time token.

The identification number of the user of the mobile communications device may be an IMSI number or an MSISDN number. The acronym IMSI stands for International Mobile Subscriber Identity, while the acronym MSISDN stands for Mobile Subscriber ISDN. The meaning and the function of these identification numbers is generally known in the art.

The authentication service and the platform may belong to the mobile network operator to which the mobile communications device is subscribed, or to another mobile network operator.

The invention will now be explained in more detail by way of an exemplary embodiment in conjunction with the accompanying drawings.

FIG. 1 illustrates an exemplary telecommunications system 10, in which the invention is implemented. Telecommunications system 10 comprises, for example, an IPTV authentication system 30 in which an IPTV authentication service 34 is installed. IPTV authentication service 34 is adapted to perform an IPTV authentication function to provide protection of privacy when a user logs into an IPTV service. IPTV authentication system 30 has a first communication interface 33, also referred to as a proxy, via which the IPTV authentication service 34 is capable to communicate with an IPTV terminal 50. In the illustrated embodiment, the IPTV terminal is configured as a set-top box with a television set connected thereto, and an IPTV client application 51, in short IPTV client 51, is installed in the IPTV terminal, which is capable to communicate with the authentication service 34 via communication interface 33. Furthermore, an IPTV platform 40 is provided on which at least one secured personalized IPTV service 41 is implemented. Each IPTV service has associated therewith an address, a so-called Uniform Resource Locator (URL), by means of which the user may request the corresponding IPTV service via IPTV client application 51. IPTV authentication service 34 of IPTV authentication system 30 is capable to communicate with IPTV service 41 via communication interface 33, or via another communication interface 35. Communication interface 33 may be configured as an HTTP or HTTPS interface. Communication between IPTV authentication system 30, IPTV service 41, and IPTV terminal 50 is effected via appropriate internet connections.

Telecommunications system 10 further comprises at least one mobile communications device 60 which belongs to the user of IPTV service 41. Mobile communications device 60 which may be a mobile telephone includes a SIM card 62 as known in the art, which has associated therewith a unique identification, for example in form of an IMSI number or an MSISDN number. Furthermore, an IPTV authentication client 61, also referred to as an authentication application, is installed in mobile communications device 60. For the present invention it is irrelevant whether the IPTV authentication application 61 is installed in mobile communications device 60 or in SIM card 62. Moreover, mobile communications device 60 comprises a bar code reader and/or a camera 63. IPTV authentication system 30 has a further communication interface 32, via which authentication service 34 is capable to communicate with IPTV authentication application 61 of mobile communications device 60. Communication interface 32 may be implemented as a combined Ua and Upa interface such as specified in technical specification 3GPP TS 33.223. As will be explained in more detail below, IPTV authentication application 61 may generate push request messages by means of which the IPTV authentication service 34 may be prompted to start an authentication process.

Communication between IPTV authentication service 34 and IPTV authentication application 61 of mobile communications device 60 is effected via a mobile communications network to which the user of mobile communications device 60 is subscribed. Assuming that the user is subscribed to mobile network operator 20. In order to be capable to perform authentication, the authentication system 30 may have a further communication interface 31 via which IPTV authentication service 34 is capable to communicate with an authentication means 21 of mobile network operator 20. To this end, communication interface 31 is preferably implemented as a Zpn interface which is standardized according to technical specification 3GPP TS 29.109. In this case, the Bootstrapping Server Function will be installed in authentication means 21, and IPTV authentication service 34 may request a challenge-response information, also known as GBA push information (GPI), from authentication means 21, in accordance with the 3GPP GBA push procedures.

Telecommunications system 10 may comprise further mobile communications networks of other mobile network operators. For the sake of simple representation, only one further mobile network operator 150 is illustrated, which also comprises an authentication means 151 with a Bootstrapping Server Function functionality. Mobile network operators 20 and 150 operate a Home Subscriber System (HSS), 22 and 152, respectively, as is known in the art. Each Home Subscriber System manages all data of the respective subscribed mobile communications devices, in conventional manner. Home subscriber system 22 manages, among others, the data of the user of mobile communications device 60.

The operation of the exemplary telecommunications system shown in FIG. 1 will now be explained in more detail by way of an exemplary embodiment with reference to FIG. 2.

Assuming first, that IPTV authentication system 30 and platform 40 are operated by mobile network operator 150. The user and mobile communications device 60 are subscribed to mobile network operator 20.

Now the user wants to obtain access to secured personalized IPTV service 41, but without having to identify himself to the IPTV service 41.

Figure 2:
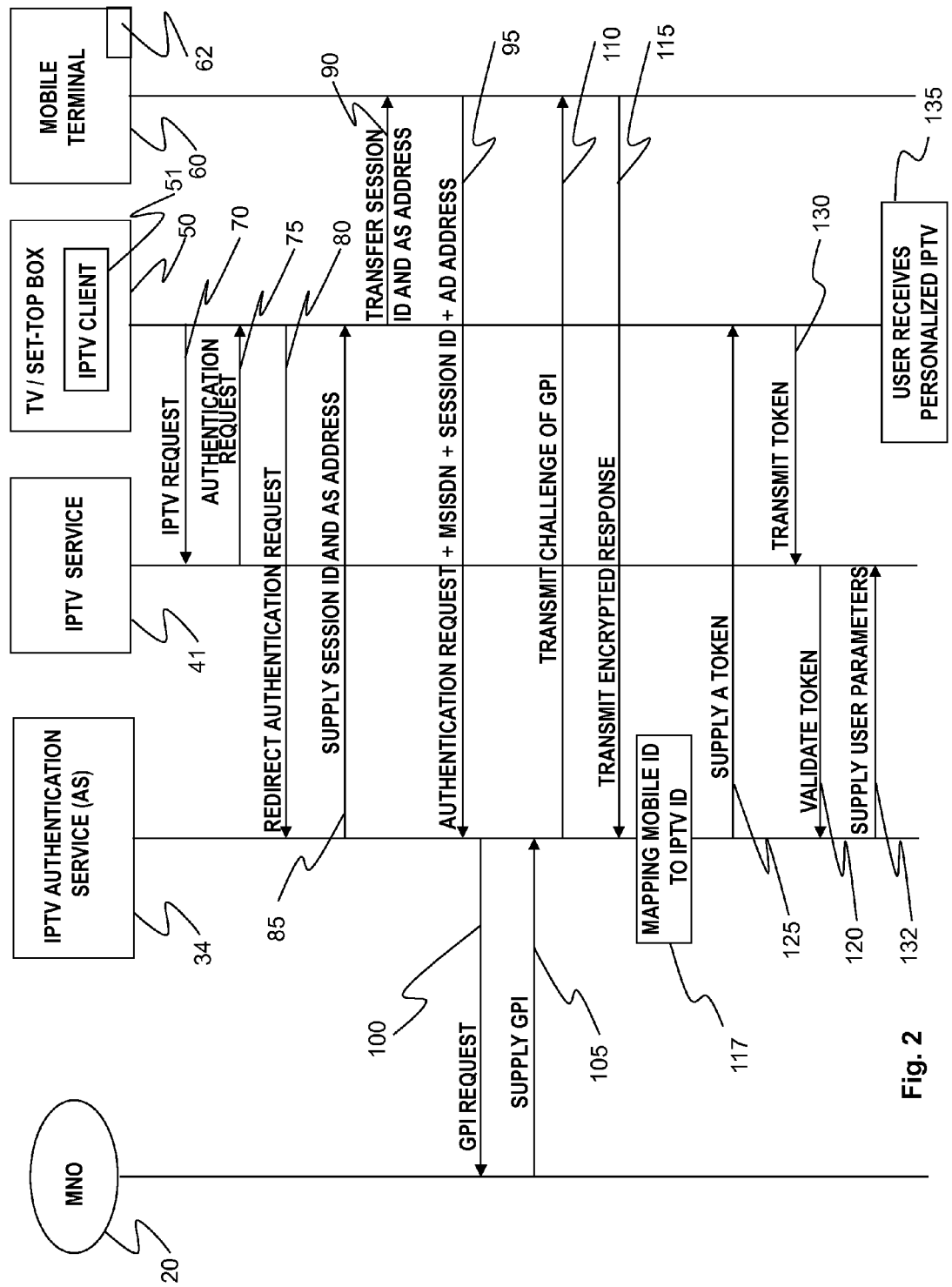
FIG. 2 shows a diagram of a communication flow for protecting privacy when a user logs into a secured personalized IPTV service using a mobile communications device.

For this purpose, as shown in FIG. 2, the user may enter an IPTV request 70 via IPTV client 51, which includes the address of the IPTV service 41, inter alia. As a result, an authentication request 75 of the IPTV service may be displayed by IPTV terminal 50 on the TV screen, which includes an option "Personalized IPTV". If the user selects this option via the setting menu of IPTV terminal 50, the IPTV client 51 is connected with the authentication service 34 via communication interface 33. IPTV client 51 now transmits an authentication request message to IPTV authentication service 34. In other words, in response to the type of authentication selected, the IPTV client 51 is redirected to IPTV authentication service 34. IPTV authentication service 34 has an appropriate authentication function which in response to the authentication request message 80 generates a response message 85 which includes the address of the IPTV authentication service (AS) 34 and the session ID of the IPTV service 41. Message 85 is preferably transmitted from IPTV authentication service 34 to IPTV client 51 in form of a bar code.

IPTV authentication service 34 may obtain the session ID of the requested IPTV service 41 in various ways. It is conceivable that the IPTV client 51 additionally transmits, in message 80, the URL of the requested IPTV service 41 to IPTV authentication service 34. IPTV authentication service 34 itself will then request the session ID from IPTV service 41.

In order to be able to realize the protection of privacy during log-in, the subscriber of mobile network operator 20 may take over the received barcode into mobile communications device 60 using the barcode reader 63 or camera 63. The transfer of the bar code is shown in FIG. 2 in step 90. The IPTV authentication application 61 of mobile communications device 60 is capable to derive the session ID and the address of the IPTV authentication service 34 from the barcode. In response to the address of the IPTV authentication service 34 received with the bar code, the IPTV authentication application 61 generates an authentication request message 95 which, for example, includes the MSISDN number of the SIM card 62 of mobile communications device 60, the session ID of the IPTV service 41, and the address of the IPTV authentication service 34. IPTV authentication application 61 transmits this authentication request message 95 via the mobile communications network of mobile network operator 20 to the interface 32 of authentication system 30.

In response to the received authentication request message 95, the IPTV authentication service 34 transmits a request message 100 via interface 31 of authentication computer 30 to the authentication means 21 of mobile network operator 20 to which the mobile communications device 60 is subscribed. In the example described, the request message 100 includes a GPI request for the Bootstrapping Server Function of authentication means 21 to transmit GPI information to IPTV authentication service 34. The GPI information is a GBA Push Information (GPI) according to technical specification 3GPP TS 33.223. In simple terms, the GPI information includes user-related keys, the challenge and the corresponding response for the challenge-response procedure which is to be performed between IPTV authentication service 34 and IPTV authentication application 61 of mobile communications device 60. Authentication means 21 may request this information via Home Subscriber System 22 of mobile network operator 20. Subsequently, authentication means 21 or the Bootstrapping Server Function thereof transmits the GPI information to IPTV authentication service 34, via communication interface 31. Authentication service 34 then transmits the challenge included in the GPI information, in a message 110, to the IPTV authentication application 61 of mobile communications device 60, via communication interface 32 and the mobile communications network of mobile network operator 20. If the IPTV authentication application 61 is installed in mobile communications device 60, and not in SIM card 62, the IPTV authentication application 61 passes the challenge to SIM card 62. SIM card 62 checks, in conventional manner (e.g. via USIM application), whether the received challenge is a correct question. In this way the SIM card 62 can verify the identity of mobile network operator 20. When successfully verified, SIM card 62, with its key, will generate the response associated with the challenge and returns it, for example in an encrypted message 115, to the IPTV authentication service 34 by means of mobile communications device 60. IPTV authentication system 30 has stored the GPI response of MNO 20, and IPTV authentication service 34 compares it with the response received. If the comparison of the response by IPTV authentication service 34 is successful, the authentication of the user is assumed to be successful.

The IPTV authentication service 34 determines an IPTV user identifier associated with the MSISDN number of SIM card 62, in short referred to as IPTV ID below, using a mapping table it has stored. This mapping between mobile communications ID and IPTV ID is designated in FIG. 2 by reference numeral 117. In response to successful authentication, IPTV authentication service 34 transmits a password, which may be a secure one-time token, in a message 125, to the IPTV client 51 of IPTV terminal 50, via communication interface 33. IPTV client 51 then transmits the password received from IPTV authentication service 34 to IPTV service 41, in a message 130. In a message 120, IPTV service 41 validates the password with IPTV authentication service 34 as a permissible log-in or authentication of the user to IPTV service 41.

Alternatively, it is also possible for the IPTV authentication service 34 to transmit the one-time token sent to IPTV client 51 additionally to IPTV service 41, in a message 120 via communication interface 33 or another interface 35. The IPTV service 41 will then compare the one-time token received from IPTV authentication service 34 with the one-time token received from IPTV client 51 for match. If the two tokens match, the client is assumed authenticated.

IPTV authentication service 34 then transmits the IPTV ID to IPTV service 41, and optionally also individually customized user parameters and/or settings associated with the IPTV ID and stored in IPTV authentication service 34, such as the age of the user, in a message 132, and in response thereto the IPTV service 41 will provide the personalized IPTV product. Alternatively, the information included in message 132 may already be transferred together with the password.

In this way, the subscriber of mobile network operator 20 is able to log into IPTV service 41 in secure manner and under protection of privacy to get the personalized IPTV.

This is in particular achieved through the fact that the mobile communications device 60 has an IPTV authentication client 61 which is capable to transmit an authentication request message 95 to IPTV authentication service 34. IPTV authentication service 34 includes an appropriately configured authentication function, which is capable to receive the authentication request message from IPTV authentication client 61 of the mobile communications device. Moreover, in response to the authentication request message, the IPTV authentication service 34 will automatically fetch the corresponding challenge-response information from the mobile network operator 20 to which the user of mobile communications device 60 is subscribed, and will then perform an authentication procedure with the mobile communications device, without any need for the user to personally identify to the IPTV service.

This guarantees a simple and secure authentication for the user and protection of privacy, since no manual input of identification information is required from the user and authentication to the IPTV service is accomplished anonymously, for example.

The invention provides for an authentication of IPTV users at their own and at other IPTV terminals, thereby allowing for provision of a mobile personalized IPTV service. In particular, a personalized mobile IPTV service is made possible at IPTV terminals where there has been no way of authenticating foreign users so far. Moreover, particularly advantageously, integrated age verification and simplified digital rights management (DRM) is made possible in this way.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for protecting privacy when a user logs into a secured personalized IPTV service using a mobile communications device that is subscribed to a mobile network operator and in which an authentication application is installed, comprising the steps of:
   requesting a secured personalized IPTV service at an IPTV terminal;
   establishing a communication connection between the IPTV terminal and an authentication service;
   transmitting an address of the authentication service and a session identifier of the secured personalized IPTV service from the authentication service to the IPTV terminal;
   transferring the address of the authentication service and the session identifier of the secured personalized IPTV service to the mobile communications device;
   in response to the address of the authentication service, transmitting an authentication message that includes an authentication request and an identification number of the mobile communications device, from the authentication application of the mobile communications device to the authentication service;
   performing secure authentication between the authentication service and the mobile communications device;
   in response to successful authentication, generating a password, and determining an IPTV user identifier associated with the identification number of the mobile communications device, by the authentication service;
   transmitting the password to the IPTV terminal;
   transmitting the IPTV user identifier to the secured personalized IPTV service; and
   logging the user into the secured personalized IPTV service by transmitting the password from the IPTV terminal to the secured personalized IPTV service.

2. The method according to claim 1, wherein a challenge-response procedure is performed as said secure authentication.

3. The method according to claim 2, wherein the authentication service requests authentication information required for performing the challenge-response procedure from the mobile network operator to which the mobile communications device is subscribed.

4. The method according to claim 1, wherein the authentication service also transmits the password to the secured personalized IPTV service, and wherein the IPTV service checks if the passwords received from the authentication service and from the IPTV terminal match.

5. The method according to claim 1, wherein the IPTV service receives the password from the IPTV terminal and validates it with the authentication service.

6. The method according to claim 1, wherein the address of the authentication service and the session identifier of the secured personalized IPTV service are transmitted to the IPTV terminal in form of encoded information;
wherein the encoded information is in the form of a bar code, and is transferred to the mobile communications device using a code reader or a camera of the mobile communications device.

7. The method according to claim 1,
wherein the authentication message generated by the authentication application further includes the address of the authentication service and the session identifier of the selected IPTV service.

8. A telecommunications system for privacy protection when a user logs into a secured personalized IPTV service using a mobile communications device, comprising:
a platform providing a secured personalized IPTV service;
an IPTV terminal;
a mobile communications device subscribed to a mobile network operator and associated with the user, in which an authentication application is installed;
an authentication service in communication with the IPTV terminal via a first communication interface and with the authentication application of the mobile communications device via a second communication interface;
wherein the authentication service is adapted to transmit an address of the authentication service and a session identifier of the secured personalized IPTV service selected at the IPTV terminal to the IPTV terminal;
wherein the telecommunications system is adapted to provide transfer of the address of the authentication service and the session identifier of the secured personalized IPTV service selected at the IPTV terminal to the authentication application of the mobile communications device;
wherein, the authentication application of the mobile communications device is adapted, in response to the received address of the authentication service, to generate an authentication message including an authentication request and an identification number of the mobile communications device and to transmit it to the authentication service via a mobile communications network;
wherein the authentication service and the authentication application of the mobile communications device are adapted to perform a secure authentication;
wherein the authentication service is adapted, in response to successful authentication, to generate a password and transmit it to the IPTV terminal via the first communication interface, and
determine an IPTV user identifier associated with the identification number of the mobile communications device to transmit it to the IPTV service;
wherein the IPTV terminal is adapted to transmit the password to the IPTV service; and
wherein the IPTV service is adapted in response to the password received, to grant access for the user to the personalized IPTV service.

9. The telecommunications system according to claim 8, wherein the authentication service and the authentication application of the mobile communications device are adapted to perform a challenge-response procedure.

10. The telecommunications system according to claim 9, wherein the authentication service is adapted to communicate with an authentication device of the mobile network operator to which the mobile communications device is subscribed via a third communication interface to obtain the information required for the challenge-response procedure.

11. The telecommunications system according to claim 8, wherein the authentication service is adapted to transmit the password to the IPTV service, via the first or a further communication interface.

12. The telecommunications system according to claim 8, wherein the password is a single-use password.

13. The telecommunications system according to claim 8, wherein the identification number of the mobile communications device is an International Mobile Subscriber Identity (IMSI) number or a Mobile Subscriber ISDN (MSISDN) number.

14. The telecommunications system according to claim 8, wherein the authentication service and the platform belong to the mobile network operator to which the mobile communications device is subscribed or to another mobile network operator.

* * * * *